Patented Feb. 5, 1929.

1,700,779

UNITED STATES PATENT OFFICE.

CHARLES M. A. STINE, AND JAMES ELIOT BOOGE, OF WILMINGTON, DELAWARE, ASSIGNORS TO E. I. DU PONT DE NEMOURS & COMPANY, OF WILMINGTON, DELAWARE, A CORPORATION OF DELAWARE.

COATING COMPOSITION AND PROCESS OF MAKING SAME.

No Drawing. Application filed November 18, 1924. Serial No. 750,661.

This invention relates to varnishes, lacquers, enamels and coating compositions containing rubber drier and methods for preparing such compositions.

Hitherto, varnishes, lacquers, etc., have been prepared ordinarily by the mixing of an oil with or without drier, a natural or synthetic varnish gum or resin and a thinner. Pigments may be incorporated in such varnishes or lacquers to give color varnishes and enamels.

In co-pending applications Serial Nos. 681,648 and 736,018, filed December 19, 1923, and September 5, 1924, respectively, methods have been disclosed for preparing coating compositions by the mixing of an oil, a drier, a solution of rubber dissolved in a suitable solvent, and a thinner. Pigments may also be incorporated in such compositions producing enamels which give protective films of considerable value in the arts. Moreover, it is shown therein that when a drier such as cobalt linoleate is incorporated in such a coating composition, it (the drier) functions as an oxidation catalyst for the oil and as a curing or vulcanizing agent for the rubber. When such a composition is applied to various surfaces, and heated under suitable conditions, a film is formed which is hard, durable, and impervious to moisture. The novel feature in one of the co-pending applications referred to is the discovery that the oil may be oxidized and the rubber cured simultaneously by the aid of the drier.

It is known that rubber which has been suitably plasticized by milling according to well-known methods may be dissolved in a suitable solvent such as benzol, solvent naphtha, turpentine, or certain petroleum distillates to give a substantially homogeneous solution.

It has been found that if a drier, such as cobalt linoleate, be incorporated in such a solution with or without pigment, and the whole thinned to the proper viscosity, and applied on a surface by flowing, spraying, brushing or dipping and be allowed to stand in contact with the air or be heated under suitable conditions, that the rubber contained therein is cured and a film is formed which is hard, durable and impervious to moisture. The chemical reactions which take place during the drying of such compositions have not been worked out. Without imposing limitations in any way by the following explanation, it seems probable that the drier acts as a carrier of atmospheric oxygen to the rubber and in this sense can be considered as a curing agent for the rubber.

The present invention is based chiefly on the discovery that driers, even in the absence of drying oils, are capable of curing rubber, and that films resulting from such a cure have valuable properties such as hardness, durability, etc., not possessed by ordinary varnish films.

It is to be understood that although the use of crude or unvulcanized Hevea rubber is preferred in the practice of our invention, we do not wish to limit ourselves to this raw material, as other types of rubber can be used with advantage, including other varieties as balata, gutta percha, etc.; also, partly or wholly vulcanized rubber including reclaim. The term rubber is therefore used throughout this specification to include crude or unvulcanized caoutchouc under which head may be included all the botanical varieties such as Hevea, balata, gutta percha, etc., and, as well, to include vulcanized rubber of any botanical variety in the state of partial or complete vulcanization as well as reclaim, etc.

By the term metal drier is meant a salt of a metal such as cobalt, lead, manganese, zinc, etc., which functions probably as a carrier of oxygen, thereby effecting oxidation of the rubber. An amount of metal drier between 0.001% and 11% is usually sufficient to accomplish the desired purpose.

By way of illustration, a coating composition consisting of 100 parts of crude Hevea rubber and 0.39 part cobalt drier (cobalt linoleate) thinned with petroleum distillate (for example, benzine) to the desired body was spread on a metal surface and allowed to stand exposed to the air for 15 hours. At the end of this time the rubber was completely cured and a hard, durable, waterproof film formed.

The above data are intended to be used for illustrative purposes only and in no way limit the nature or proportion of ingredients. Any variety of rubber may be used with any drier. Any of the ordinary rubber solvents may be used as a thinner, including gasoline, benzol, toluol, solvent naphtha, turpentine, and turpentine substitute. These solvents may be designated as "liquid hydrocarbons"

and whenever such term is used, it is meant to include any or all of the above mentioned substances.

The time and temperature conditions stated in the above illustration are not to be construed as being necessary conditions, since the time of cure may be varied at will and the temperature varied from ordinary or room temperature to about 500° F.

Pigments may be incorporated in such compositions to give rubber enamels having many useful and desirable protective properties. Many pigments act as oxygen-carriers and in this respect resemble driers. Compositions of the type described, containing pigments, will cure in a shorter time than those without; indeed, the cure of rubber films by pigments alone is quite feasible. Among such pigments may be mentioned Prussian blue, various chromates, white lead, aluminum hydrate, etc.

The usefulness of protective films of the type herein described may be increased by the addition of substances known as softeners. We designate by softeners all difficultly volatilized substances which, on the incorporation to the extent of about 5% (on the total composition) impart the property of flexibility, elasticity, or toughness to the film. The following substances are examples of softeners: di-n-butyl phthalate, castor oil, tricresyl phosphate, etc. These examples are merely a few from a large number of substances known to impart the qualities described and our claims are by no means limited to these three substances.

We claim:

1. A composition comprising a mixture of rubber and a drier in such proportions that a surface layer thereof will become cured by action of the drier when exposed to the air at a temperature between 80° and 500° F.

2. A coating composition comprising a liquid containing an incompletely vulcanized rubber and a drier and being substantially free from a drying oil, the proportion of drier and rubber being such that the rubber in a surface layer of said liquid when exposed to the air at a temperature between 80 and 500° F. will become cured.

3. A composition as defined in claim 2 in which the rubber is crude rubber and the drier is a salt of cobalt.

4. A coating composition comprising a liquid containing rubber which has not been completely cured or vulcanized, and a substance capable of acting as an oxygen-carrier, the ratio of said substance to the rubber being such that the rubber in a surface layer of said liquid when exposed to the air at a temperature between 80° and 500° F. will become cured.

5. A coating composition comprising rubber, a substance capable of acting as an oxygen-carrier, and a softener, from about 0.001% to 11% of said oxygen-carrier and not substantially over 5% of the softener being used based on the weight of rubber present.

6. A composition as defined in claim 1 in which the amount of drier is equivalent to between 0.001% and 11% of cobalt based on the weight of rubber present.

7. A composition as defined in claim 5 in which the oxygen-carrier is a salt of cobalt.

8. The process of making a film of cured rubber which comprises mixing rubber, a volatile thinner and a metal drier to form a coating composition substantially free from drying oil, exposing said composition to the air as a film and heating to effect the cure of the rubber by the drier and the evaporation of the thinner.

9. The process which comprises heating to a temperature below 500° F., in the form of a thin film, a mixture free from drying oil and containing rubber, and a metal drier equivalent to between 0.001% and 11% of cobalt based on the weight of rubber present, to cure the rubber by action of the drier, the film being exposed to the air during heating.

In testimony whereof we affix our signatures.

CHARLES M. A. STINE.
JAMES ELIOT BOOGE.